United States Patent
Chia et al.

(10) Patent No.: US 7,274,833 B2
(45) Date of Patent: Sep. 25, 2007

(54) IMAGE PROCESSING DEVICE FOR SCALING IMAGE FRAME

(75) Inventors: Pingo Chia, Taipei (TW); Titan Sun, Taipei (TW)

(73) Assignee: Via Technologies, Inc., Taipei (TW)

( * ) Notice: Subject to any disclaimer, the term of this patent is extended or adjusted under 35 U.S.C. 154(b) by 686 days.

(21) Appl. No.: 10/336,499

(22) Filed: Jan. 3, 2003

(65) Prior Publication Data

US 2003/0174903 A1 Sep. 18, 2003

(30) Foreign Application Priority Data

Mar. 15, 2002 (TW) .............................. 91104890 A (51) Int. Cl.
  G06K 9/32 (2006.01)
  G06K 9/40 (2006.01)
  H04N 9/74 (2006.01)
  G06T 11/00 (2006.01)
  G09G 5/02 (2006.01)
(52) U.S. Cl. ...................... 382/298; 382/263; 382/264; 348/581; 345/472; 345/698
(58) Field of Classification Search ........ 382/260–265, 382/298, 299; 348/581, 584, 598; 345/472, 345/698, 699
See application file for complete search history.

(56) References Cited

U.S. PATENT DOCUMENTS

| 4,213,150 A | * | 7/1980 | Robinson et al. ............. 348/26 |
| 5,014,129 A | * | 5/1991 | Imanishi ..................... 348/581 |
| 6,380,978 B1 | * | 4/2002 | Adams et al. ............. 348/452 |
| 6,587,158 B1 | * | 7/2003 | Adams et al. ............. 348/716 |

* cited by examiner

*Primary Examiner*—Matthew C. Bella
*Assistant Examiner*—Wes Tucker (57) ABSTRACT

An image processing device is provided. The image processing device includes a control unit, a first storing zone, a frame buffer register, a first buffering zone and a first image processor. The first storing zone is electrically connected to the control unit and storing therein a first image frame. The frame buffer register is electrically connected to the control unit and the first storing zone, and performing a first image processing operation on the first image frame in response to a first control signal from the control unit so as to form a first processed frame. The first buffering zone receives and stores the first processed frame from the frame buffer register. The first image processor is electrically connected to the first buffering zone and processing the first processed frame into a first image signal in response to a second control signal from the control unit.

8 Claims, 6 Drawing Sheets

IMAGE PROCESSING DEVICE FOR SCALING IMAGE FRAME

FIELD OF THE INVENTION

The present invention relates to an image processing device for scaling an image frame, and more particularly to an image processing device for scaling an image frame by using an off-screen technology.

BACKGROUND OF THE INVENTION

Multimedia image frames having video/audio effects and diversities are basic requirements for image processing apparatus such as individual appliance or personal computers. Further, it is preferred to enhance video/audio effects and diversities of image frames with limited cost.

Figure 1A:
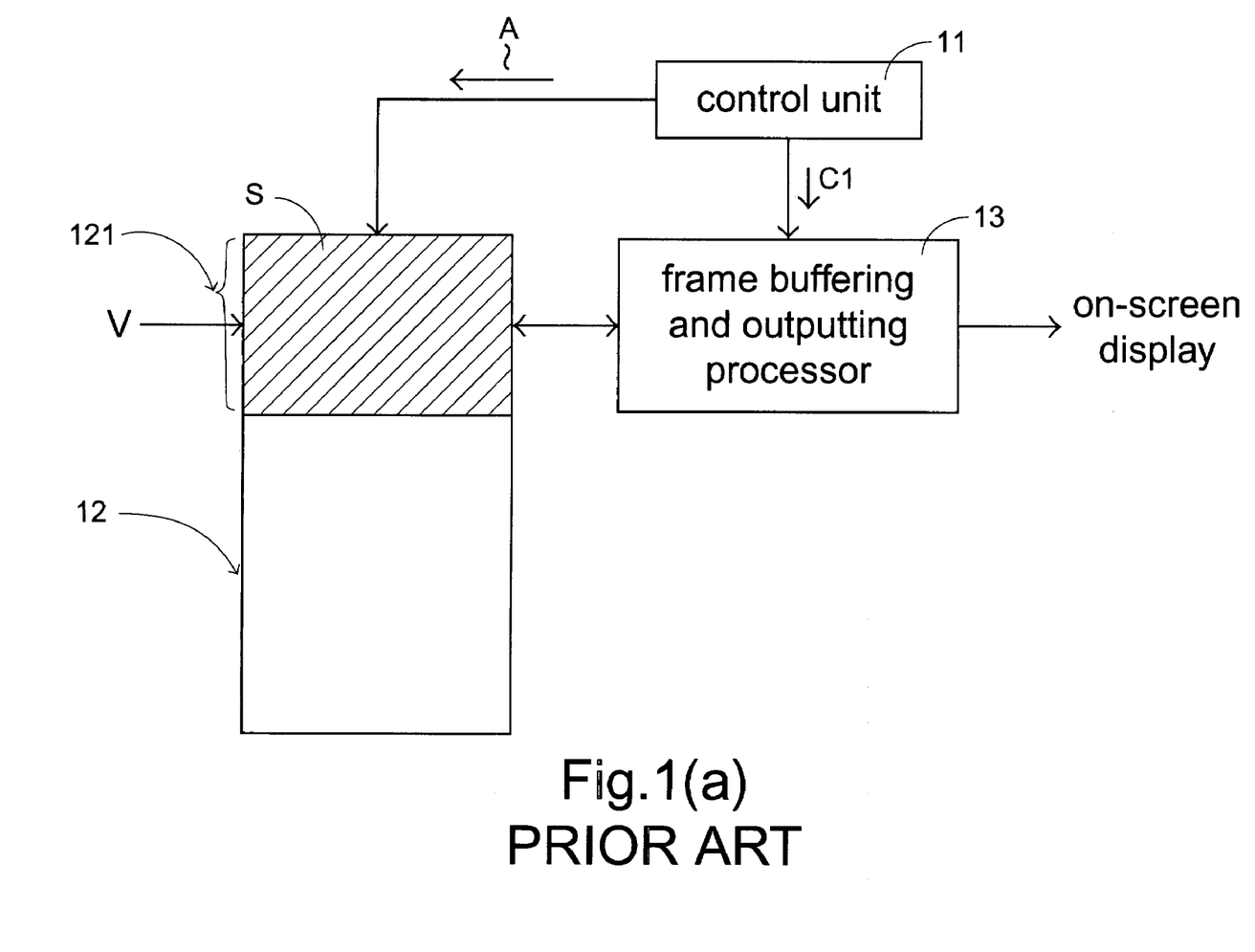
FIG. 1(a) is a functional block diagram illustrating an image processing device by means of on-screen technology in the prior art.
Figure 1B:
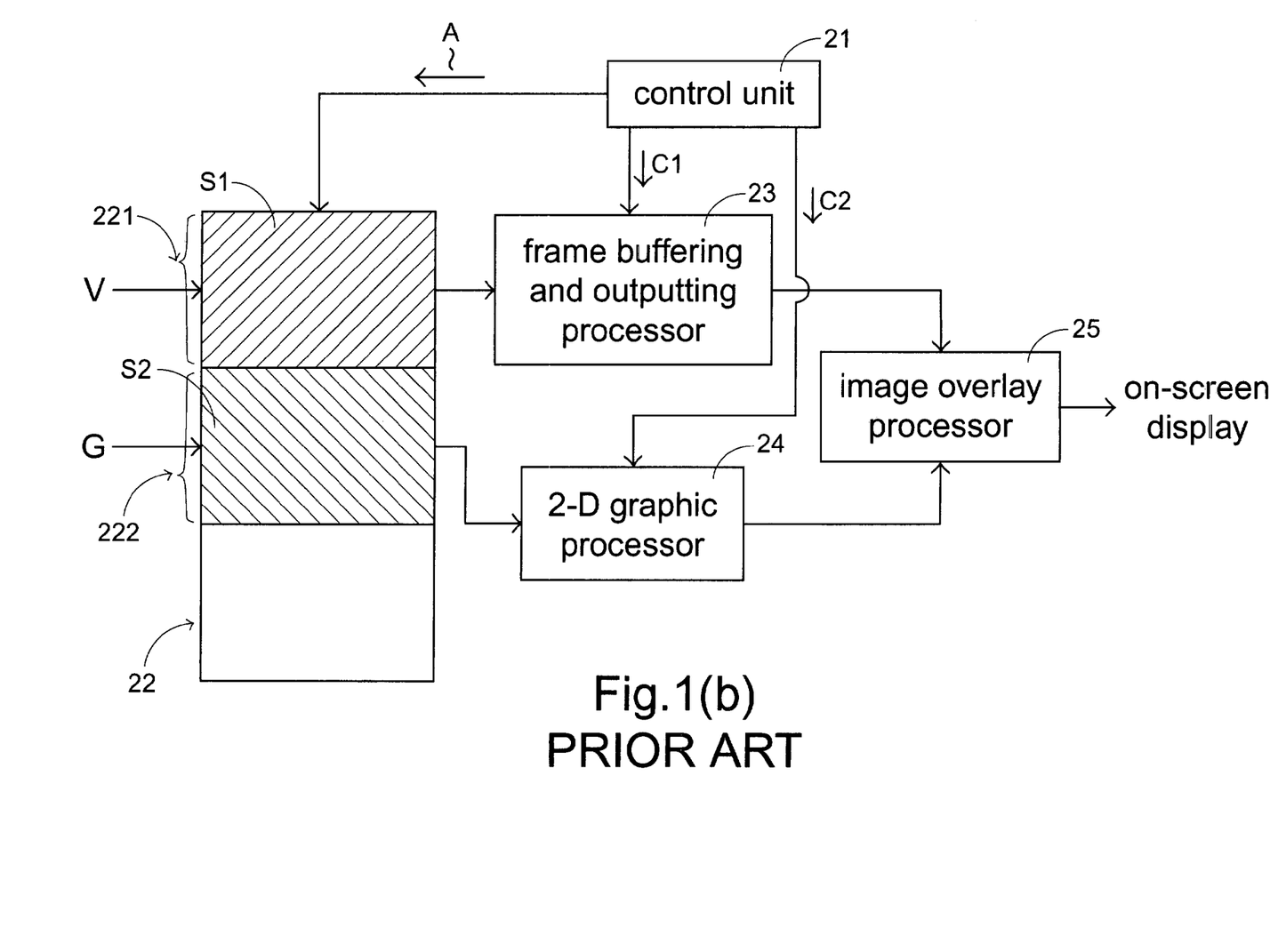
FIG. 1(b) is a functional block diagram illustrating another image processing device by means of on-screen technology in the prior art.

In a typical scaling-down/scaling-up procedure for an image frame, an on-screen resolution technology is employed to process the image frame by an image processing device for a real-time display on a screen. FIGS. 1(a) and 1(b) are functional block diagrams illustrating two image processing devices by means of on-screen technology in the prior art. The image processing device shown in FIG. 1(a) is used to perform scaling-down/scaling-up operations, whereas the image processing device shown in FIG. 1(b) further conducts an image overlay effect in addition to the scaling-down/scaling-up operations. The scaled image frame is combined with another image frame such as a static 2-D image frame and outputted in an on-screen mode as overlay images.

Referring to FIG. 1(a), the image processing device principally comprises a control unit 11, a memory 12 assigned to the image processing device by the operating system (OS) and a frame buffering and outputting processor 13. A video image signal V generated from a video apparatus such as a video recorder, a TV set, a VCD-ROM or a DVD-ROM, and having a data format selected from YUV422, RGB15, RGB16, RGB32, YcbCr420, and the like, is first stored into an image storage zone 121 of the memory 12 as an image frame S in response to an image storing signal A asserted by the control unit 11. Further, in response to a control signal C1 asserted by the control unit 11, a scaling-down/scaling-up procedure is performed on the image frame S and the scaled image frame is outputted in an on-screen mode by the frame buffering and outputting processor 13.

The image processing device in FIG. 1(b) comprises a control unit 21, a memory 22 assigned to the image processing device by the operating system (OS), a frame buffering and outputting processor 23, and further a two-dimensional (hereinafter, 2-D) graphic processor 24 and an image overlay processor 25. The video image signal V from a video device is first stored into the image storage zone 221 of the memory 22 as an image frame S1 in response to an image storing signal A asserted by the control unit 21. A 2-D image signal G is stored into a 2-D image storage zone 222 of the memory 22 as a static 2-D image frame S2. On the other hand, in response to the control signal C1 from the control unit 21, a scaling-down/scaling-up procedure is performed on the image frame S1 and the scaled image frame is outputted in an on-screen mode by the frame buffering and outputting processor 23. On the other hand, in response to another control signal C2 from the control unit 21, the 2-D image frame S2 is processed by the 2-D graphic processor 24. The processed video image frame and 2-D image frame are transferred into the image overlay processor 25 and outputted by means of the on-screen technology.

In order to exempt from image delay, the number of image frames displayed on the screen per second, for example by the device of FIG. 1(a), should be more than 30 in average, and the video images are temporarily stored in the image storage zone 221 of the memory 22 and then immediately performed thereon image scaling operations in the queues of the frame buffering and outputting processor 23. The scaled images are then outputted on a real-time basis. For purpose of easily performing the scaling-down operation in the vertical dimension, the required size of each queue of the frame buffering and outputting processor 23 varies with the compression ratios and the row numbers (in the horizontal dimension) of the images. In brief, the capacity of the queues has to be large enough for storing several complete rows of image at the same time so that the images scaled in the vertical dimension can be performed on the on-screen basis.

Such image processing device based on the on-screen technology, therefore, is cost-inefficient and design-inflexible because a large queue size is required. In addition, the control unit 11 is largely occupied in processing the image frames S and S1 due to the real-time display. Therefore, additional tasks for enhancing image quality, for example low pass filtering or high pass filtering, are not expected to be done by the control unit 11 in general cases. The high quality of image cannot be acquired.

SUMMARY OF THE INVENTION

It is an object of the present invention to provide an image processing device by using an off-screen technology, which requires a relatively small memory size to achieve the similar purpose, so as to be cost-effective.

It is another object of the present invention to provide an image processing device by using an off-screen technology, in which the quality for displaying an image is largely enhanced.

In accordance with an aspect of the present invention, there is provided an image processing device. The image processing device comprises a control unit, a first storing zone, a frame buffer register, a first buffering zone and a first image processor. The first storing zone is electrically connected to the control unit and storing therein a first image frame. The frame buffer register is electrically connected to the control unit and the first storing zone, and performing a first image processing operation on the first image frame in response to a first control signal from the control unit so as to form a first processed frame. The first buffering zone receives and stores the first processed frame from the frame buffer register. The first image processor is electrically connected to the first buffering zone and processing the first processed frame into a first image signal in response to a second control signal from the control unit.

In an embodiment, the control unit is a micro-controller or a central processing unit (CPU). The frame buffer register has a storing capacity of n rows and m columns and pixels of the first image frame are transferred into the frame buffer register in batches, where n and m are positive integers, n is equal to or less than the row number of the first image frame, and m is equal to or less than the column number of the first image frame.

In an embodiment, the first image processing operation includes an image scaling procedure. Furthermore, the first image processing operation comprises an image quality enhancing procedure. The image quality enhancing procedure performs both low pass filtering and high pass filtering.

In an embodiment, the first image signal is outputted for display.

In an embodiment, the image processing device of the present invention further comprises a second image processor and an image overlay processor. The second image processor is electrically connected to the first storing zone and processing the first image frame into a second image signal in response to a third control signal from the control unit. The image overlay processor is employed for receiving and processing the first image signal and the second image signal so as to result in an overlay effect.

In an embodiment, the image processing device of the present invention further comprises a second storing zone, a second image processor and an image overlay processor. The second storing zone stores therein a second image frame. The second image processor is electrically connected to the second storing zone and processing the second image frame into a second image signal in response to a third control signal from the control unit. The image overlay processor is employed for receiving and processing the first image signal and the second image signal so as to result in an overlay effect. The first and the second image processors are a video signal processor and a two-dimensional graphic processor, respectively.

In an embodiment, a second image processing operation is further performed on the first image frame in response to a third control signal from the control unit so as to form a second processed frame, and the image processing device further comprises a second buffering zone, a second image processor and an image overlay processor. The second buffering zone receives and stores the second processed frame from the frame buffer register. The second image processor is electrically connected to the second buffering zone and processing the second image frame into a second image signal in response to a fourth control signal from the control unit. The image overlay processor is employed for receiving and processing the first image signal and the second image signal so as to result in an overlay effect. Preferably, the second image processing operation includes an image scaling procedure and optionally an image quality enhancing procedure, and the image quality enhancing procedure performs both low pass filtering and high pass filtering.

In accordance with another aspect of the present invention, there is provided an image processing device. The image processing device comprises a control unit, a memory, a frame buffer register and a first image processor. The memory has a first storing zone electrically connected to the control unit and storing therein a first image frame. The frame buffer register is electrically connected to the control unit and the memory, and performing a first image processing operation on the first image frame in response to a first control signal from the control unit so as to form a first processed frame, wherein the first processed frame is stored into a first buffering zone of the memory. The first image processor is electrically connected to the memory and processing the first processed frame into a first image signal in response to a second control signal from the control unit.

In accordance with another aspect of the present invention, there is provided an image processing device. The image processing device comprises a control unit, a memory, a frame buffer register and an image processor. The memory has a storing zone electrically connected to the control unit and storing therein an image frame. The frame buffer register is electrically connected to the control unit and the memory, and performing an image scaling and an image quality enhancing operations on the image frame in response to a first control signal from the control unit so as to form a processed frame, wherein the processed frame is stored into a buffering zone of the memory. The image processor is electrically connected to the memory and processing the processed frame into an signal in response to a second control signal from the control unit.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
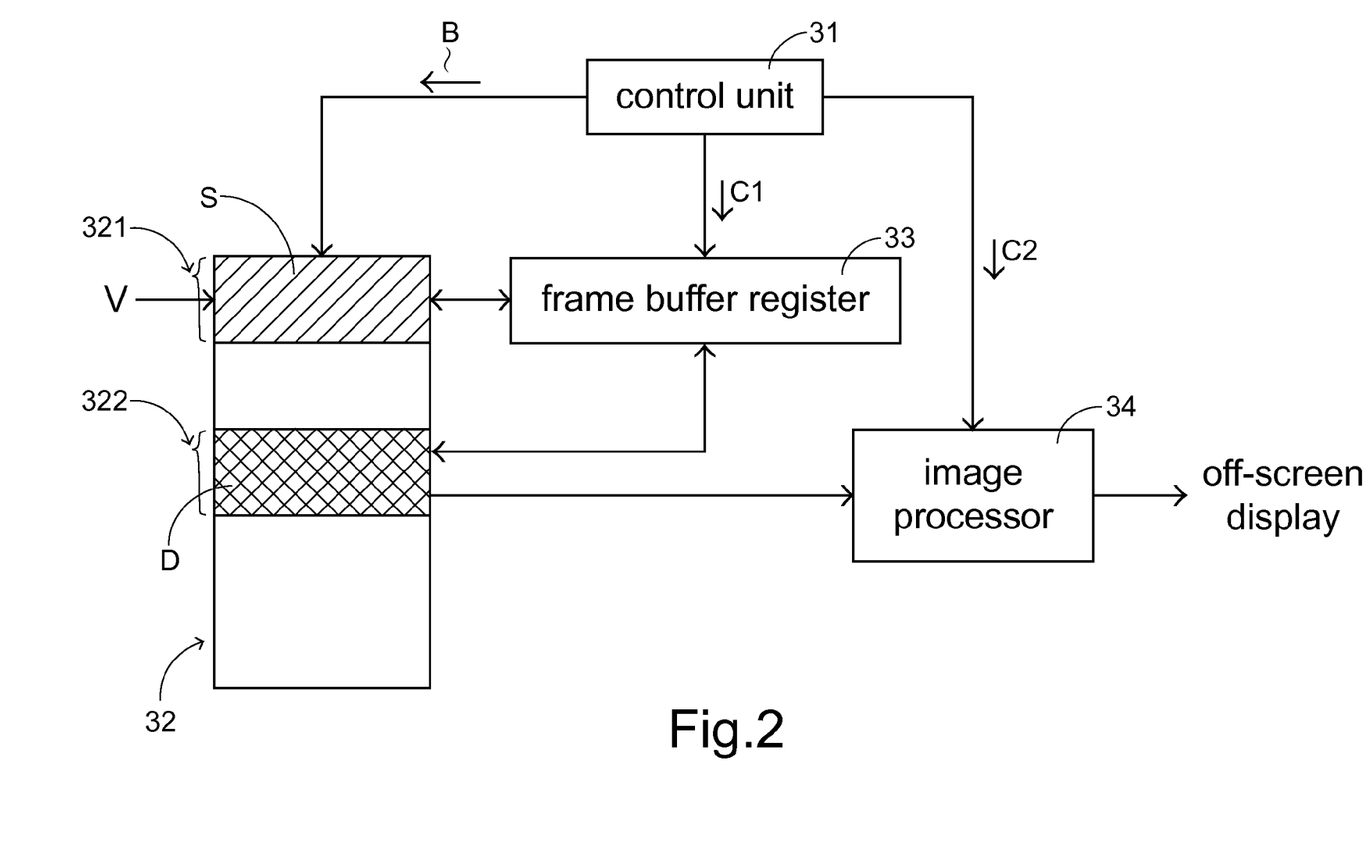
FIG. 2 is a functional block diagram illustrating an image processing device according to a first preferred embodiment of the present invention.

FIG. 2 is a functional block diagram illustrating an image processing device according to a preferred embodiment of the present invention. The image processing device comprises a control unit 31, a memory 32 assigned to the image processing device by the operating system (OS), a frame buffer register 33 and an image processor 34. An image signal V is first stored into a storing zone 321 of the memory 32 as an image frame S in response to an image storing signal B asserted by the control unit 31. Further, in response to a control signal C1 asserted by the control unit 31, an image processing operation is performed on the image frame S and the resulting image frame D is stored into a buffering zone 322. Then, the image frame D is further processed by the image processor 34 into an image signal for output in response to a second control signal C2 asserted by the control unit 31. Thus, the image signal is outputted from the image processor 34 in an off-screen mode.

The control unit 31, for example, can be a micro-controller or a central processing unit (CPU). The image signal V can be a video image signal generated from a video apparatus such as a video recorder, a TV set, a VCD-ROM or a DVD-ROM, and having a data format such as YUV422, RGB15, RGB16, RGB32, YcbCr420, or the like. Alternatively, the image signal V can be a 2-D graphic signal. Accordingly, the image processor 34 can be a video signal processor or a 2-D graphic processor, or any other processor depending on the type of image frame D.

According to a preferred embodiment, the image processing operation includes an image scaling procedure and an image quality enhancing procedure. By the image scaling procedure, image scaling in the horizontal dimension and/or vertical dimension are performed. There is no particular requirement on the sequence for performing the horizontal dimension and the vertical dimension image scaling procedures in general cases. The image scaling procedure in the horizontal (row) direction, however, due to easier implementation, is preferably performed prior to the image scaling procedure in the vertical (column) direction. On the other hand, for example, the image quality enhancing procedure includes a low pass filtering procedure and/or a high pass filtering procedure. There is no particular requirement on the sequence for performing the low and the high pass filtering procedures in general cases if both are performed. The low pass filtering procedure, however, is preferably performed prior to the high pass filtering procedure for the following reason. The image frame S subject to the low pass filtering will be blurred so as to drop some pixels. In order to avoid the deterioration of the image quality of the image frame S, the high pass filtering procedure is performed to clarify the image edges.

In an off-screen mode, the image frame S stored in the storing zone 321 is not required to be processed immediately, so the image processing operation can be well performed by the frame buffer register 33 in response to the first control signal C1 asserted when the control unit 31 is in an idle or spare state. Furthermore, due to the off-screen feature, the size of the frame buffer register 33 can be smaller than the size of the image frame S in the horizontal direction as well as the vertical direction. For example, assuming the frame buffer register 33 has a capacity of n rows and m columns, where n and m are positive integers, n can be less than the row number of the image frame S, and m can be less than the column number of the image frame S. Of course, n and m can be as large as the row and column numbers of the image frame S, or even larger. Such design, however, will be relatively cost()inefficient. The data format in the frame buffer register 33 is preferably queue-based. Depending on the practical demand, the frame buffer register 33 includes a plurality of one-way queues, and the memory sizes of the queues, for example, can be 8×64, 16×64 and/or 32×64 bits, etc. In a case that each one-way queue of the frame buffer register 33 for receiving the image frame S has a storing capacity smaller than the size of the image frame S, pixels of the image frame S are transmitted into the frame buffer register 33 in batches. For example, pixels in a single batch include m columns and less than n rows of pixels of the image frame S. Alternatively, n rows and less than m columns or less than n rows and less than m columns of pixels of the image frame S are included in a single batch. In other words, the image frame S can be divided into small image portions, whose size depends on the capacity of the queue size of the frame buffer register 33, to be processed in sequence.

As mentioned above, the image quality enhancing procedure preferably performs both low pass filtering and high pass filtering. The low pass filtering can be operated by reducing two pixels into one pixel (2 tap), reducing three pixels into one pixel (3 tap), reducing four pixels into one pixel (4 tap) or reducing five pixels into one pixel (5 tap). The high pass filtering is operated according to the following formula:

$$N(p)=F1*(S(p-1)+S(p+1))+F2*S(p),$$

where

S(p) is data of a selected pixel to be high pass filtered;
S(p−1) is data of a pixel immediately followed by S(p);
S(p+1) is data of a pixel immediately preceded by S(p);
N(p) is data of the selected pixel after being high pass filtered; and
F1 and F2 are multi-bit image factors.

Figure 3:
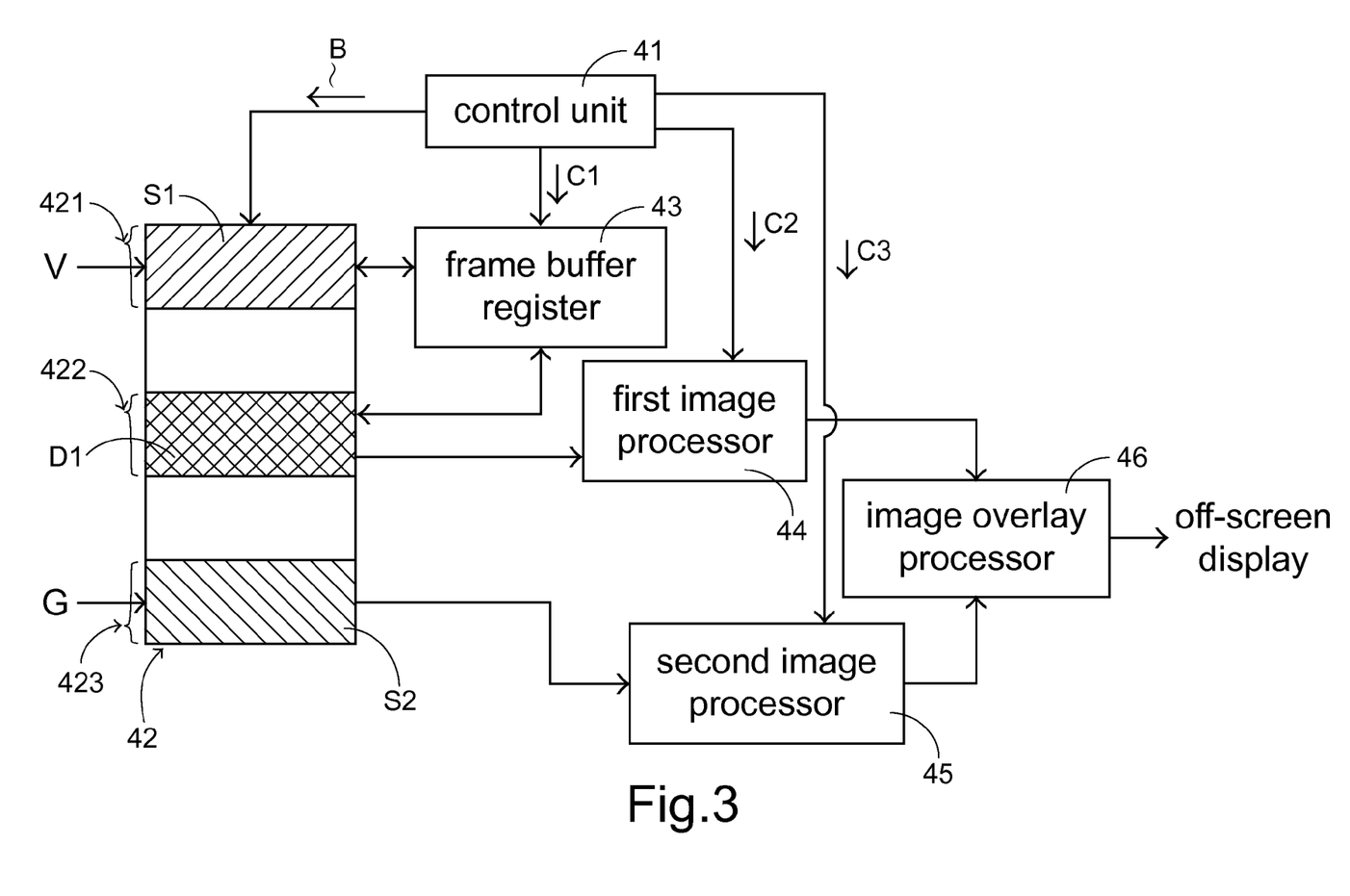
FIG. 3 is a functional block diagram illustrating an image processing device according to a second preferred embodiment of the present invention, which exemplified an image overlay operation.
Figure 4:
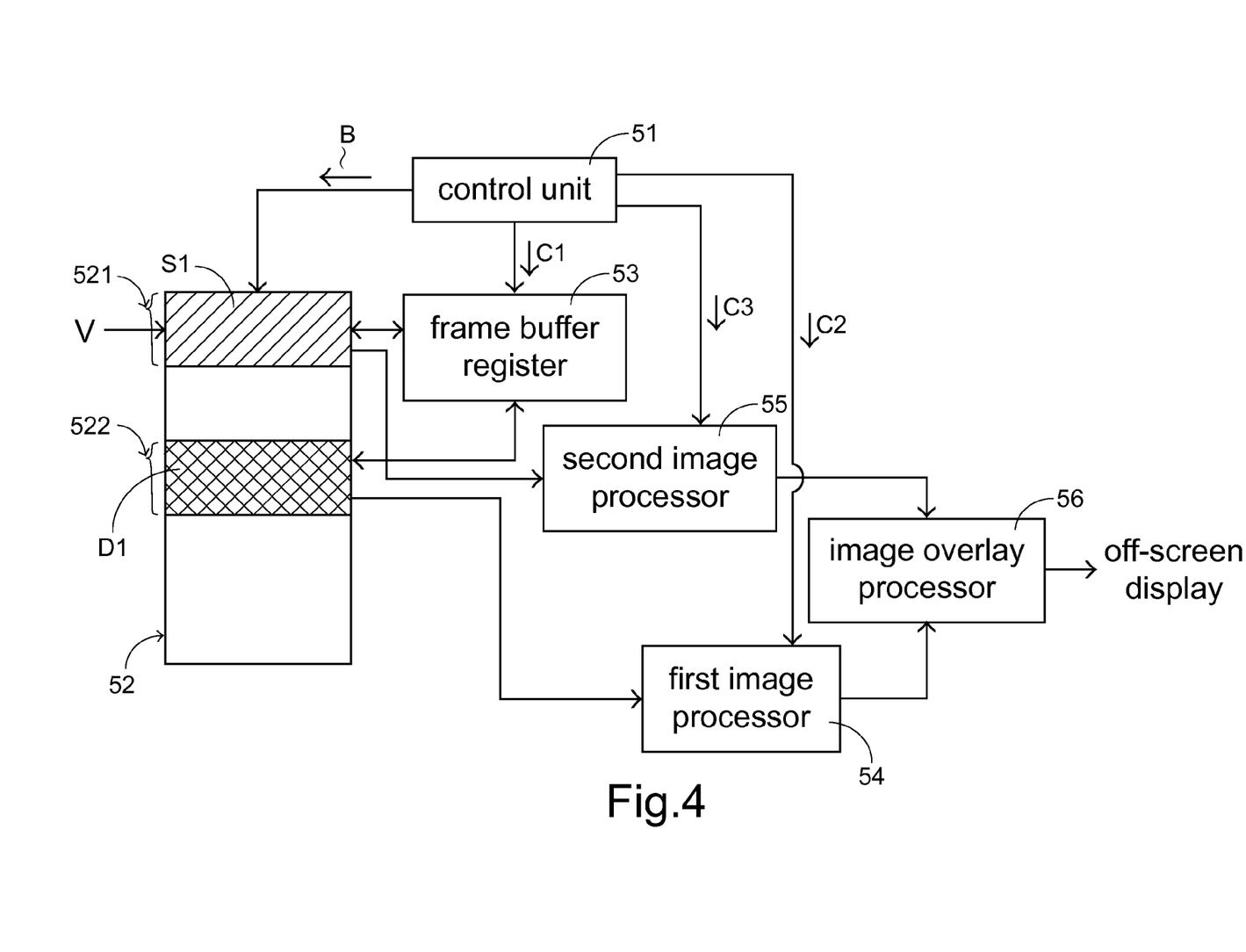
FIG. 4 is a functional block diagram illustrating another image overlay operation performed by the image processing device of FIG. 3 according to a third preferred embodiment of the present invention.
Figure 5:
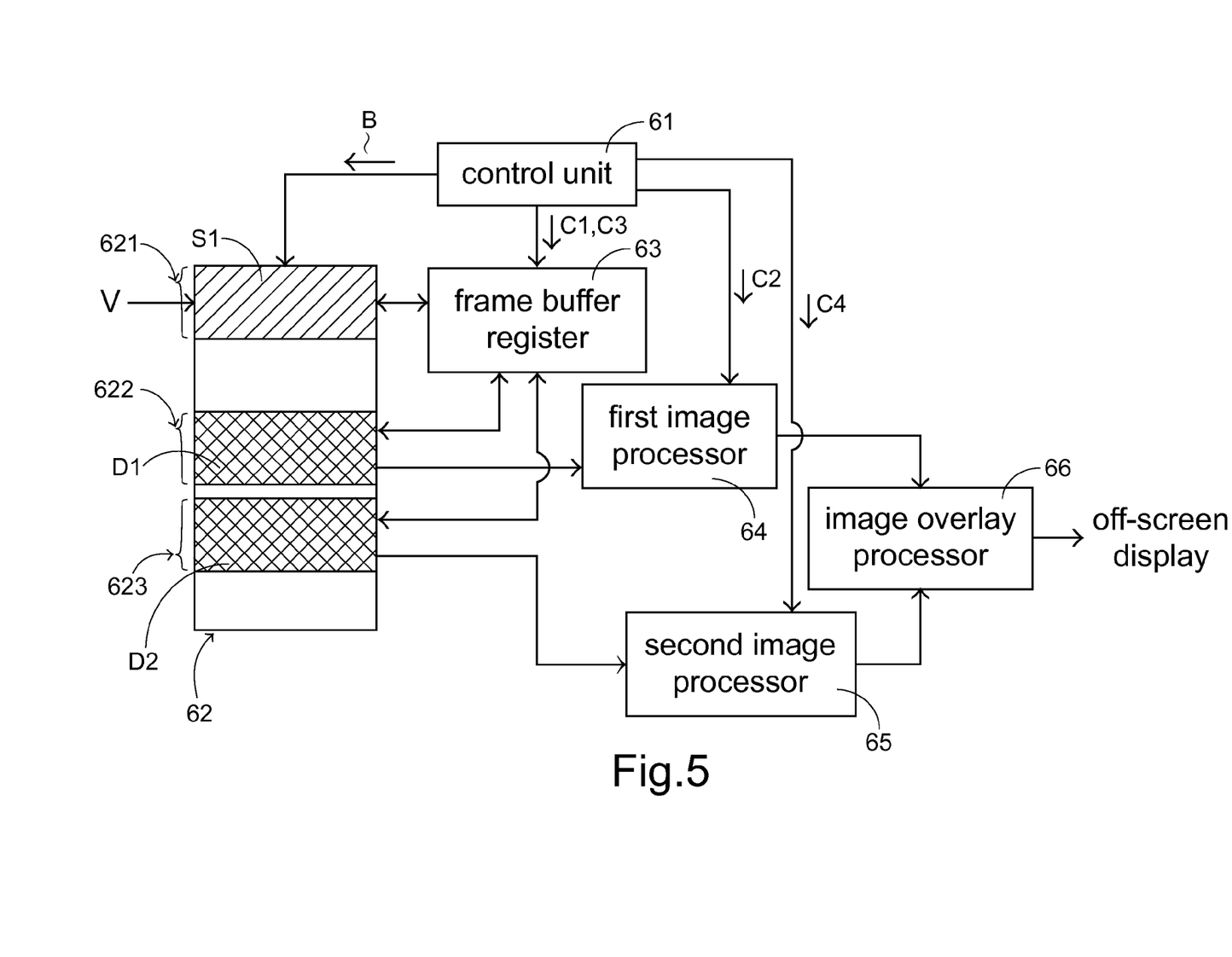
FIG. 5 is a functional block diagram illustrating a further image overlay operation performed by the image processing device of FIG. 3 according to a fourth preferred embodiment of the present invention.

FIGS. 3, 4 and 5 schematically show three image overlay examples, respectively, by using an overlay-image processing device as shown according to the present invention.

The image processing device of FIG. 3 comprises a control unit 41, a memory 42 assigned to the image processing device by the operating system (OS), a frame buffer register 43, a first image processor 44, a second image processor 45 and an image overlay processor 46. An image signal V is first stored into a first storing zone 421 of the memory 42 as a first image frame S1 in response to an image storing signal B asserted by the control unit 41. Further, in response to a control signal C1 asserted by the control unit 41, an image processing operation is performed on the first image frame S1 and the resulting image frame D1 is stored into a buffering zone 422. Then, the image frame D1 is processed by the first image processor 44 into a first display signal in response to a second control signal C2 asserted by the control unit 41. On the other hand, another image signal G is stored into a second storing zone 423 of the memory 42 as a second image frame S2. The second image frame S2 is processed into a second display signal by the second image processor 45 in response to a third control signal C3 asserted by the control unit 41. The first display signal and the second display signal are then processed by the image overlay processor 46 to be imparted thereto an overlay effect for off-screen display.

The image signal G can be a video image signal generated from a video apparatus such as a video recorder, a TV set, a VCD-ROM or a DVD-ROM, and having a data format selected from YUV422, RGB15, RGB16, RGB32, YcbCr420, and the like. Alternatively, the image signal G can be generated by a 2-D graphic processor. For the above examples, the image processor 44 is either a video signal processor or a 2-D graphic processor.

The image processing device of FIG. 4 is similar to that of FIG. 3 except the images to be overlay-processed are different. An image signal V is first stored into a storing zone 521 of the memory 52 as an image frame S1 in response to an image storing signal B asserted by the control unit 51. Further, in response to a control signal C1 asserted by the control unit 51, an image processing operation is performed on the image frame S1 and the resulting image frame D1 is stored into the buffering zone 522. Then, the image frame D1 is processed by the first image processor 54 into a first display signal in response to a second control signal C2 asserted by the control unit 51. On the other hand, it is the image frame S1 in this example be further processed into a second display signal by the second image processor 55 in response to a third control signal C3 asserted by the control unit 51. The first display signal and the second display signal are then processed by the image overlay processor 56 to be imparted thereto an overlay effect for off-screen display.

The image processing device of FIG. 5 is similar to that of FIG. 3 or FIG. 4 except the images to be overlay-processed are different. An image signal V is first stored into a storing zone 621 of the memory 62 as an image frame S1 in response to an image storing signal B asserted by the control unit 61. Further, in response to a control signal C1 asserted by the control unit 61, an image processing operation is performed on the image frame S1 and the resulting image frame D1 is stored into the first buffering zone 622. Then, the image frame D1 is processed by the first image processor 64 into a first display signal in response to a second control signal C2 asserted by the control unit 61. In this example, another image processing operation is performed on the image frame S1 in response to a control signal C3 asserted by the control unit 61, and the resulting image frame D2 is stored into the second buffering zone 623. Then, the image frame D2 is processed by the second image processor 65 into a second display signal in response to a second control signal C4 asserted by the control unit 61. The first display signal and the second display signal are then processed by the image overlay processor 66 to be imparted thereto an overlay effect for off-screen display.

The image processing operations described in the above-mentioned embodiments, for example, may include an image scaling procedure and/or an image quality enhancing procedure. The image scaling procedure generally performs both horizontal dimension and vertical dimension image scaling. The image quality enhancing procedure preferably performs both low pass filtering and high pass filtering.

From the above description, it is understood that the image processing device of the present invention is cost-efficient by using an off-screen technology without sacrificing the image quality. On the contrary, the quality for displaying an image can be enhanced because there is sufficient time for the image quality enhancing procedure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image processing device for performing off-screen display, comprising:
    a control unit;
    a first storing zone disposed in a memory, electrically connected to said control unit and storing therein a first image frame;
    a frame buffer register electrically connected to said control unit and said first storing zone, and having a total buffer size of n rows and m columns, where n is a positive integer less than the row number of said first image frame, and m is a positive integer less than the column number of said first image frame, said frame buffer register receiving said first image frame portion by portion to perform image scaling and image quality enhancing operations in response to a first control signal from said control unit, wherein the size of each portion is equal to said total buffer size;
    a first buffering zone disposed in the same memory as the storing zone, and receiving and storing said first image frame having been processed by said frame buffer register portion by portion to form a first processed frame; and
    a first image processor electrically connected to said first buffering zone and processing said first processed frame into a first image signal in response to a second control signal from said control unit to be displayed in an off-screen mode.

2. The image processing device according to claim 1 wherein said control unit is a micro-controller or a central processing unit (CPU).

3. The image processing device according to claim 1 wherein said image quality enhancing operation includes both low pass filtering and high pass filtering.

4. The image processing device according to claim 1 further comprising:
    a second image processor electrically connected to said first storing zone and processing said first image frame into a second image signal in response to a third control signal from said control unit; and
    an image overlay processor for receiving and processing said first image signal and said second image signal so as to result in an overlay effect.

5. The image processing device according to claim 1 further comprising:
    a second storing zone disposed in said memory and storing therein a second image frame;
    a second image processor electrically connected to said second storing zone and processing said second image frame into a second image signal in response to a third control signal from said control unit; and
    an image overlay processor for receiving and processing said first image signal and said second image signal so as to result in an overlay effect.

6. The image processing device according to claim 5 wherein said first and said second image processors are a video signal processor and a two-dimensional graphic processor, respectively.

7. The image processing device according to claim 1 wherein an image scaling procedure and optionally an image quality enhancing procedure are further performed on said first image frame portion by portion by said frame buffer register in response to a third control signal from said control unit so as to form a second processed frame, and said image processing device further comprising:
    a second buffering zone disposed in said memory for receiving and storing said second processed frame from said frame buffer register;
    a second image processor electrically connected to said second buffering zone and processing said second processed frame into a second image signal in response to a fourth control signal from said control unit; and
    an image overlay processor for receiving and processing said first image signal and said second image signal so as to result in an overlay effect.

8. The image processing device according to claim 7 wherein said image quality enhancing procedure performs both low pass filtering and high pass filtering.

* * * * *